US008887376B2

(12) United States Patent
Gerster et al.

(10) Patent No.: US 8,887,376 B2
(45) Date of Patent: Nov. 18, 2014

(54) METHOD FOR PRODUCTION OF A SOFT-MAGNETIC CORE HAVING COFE OR COFEV LAMINATIONS AND GENERATOR OR MOTOR COMPRISING SUCH A CORE

(75) Inventors: Joachim Gerster, Alzenau (DE); Witold Pieper, Hanau (DE); Rudi Ansmann, Moembris (DE); Michael Koehler, Neuberg (DE); Michael Von Pyschow, Hanau (DE)

(73) Assignee: Vacuumschmelze GmbH & Co. KG, Hanau (DE)

( * ) Notice: Subject to any disclaimer, the term of this patent is extended or adjusted under 35 U.S.C. 154(b) by 1296 days.

(21) Appl. No.: 11/663,271

(22) PCT Filed: Jul. 18, 2006

(86) PCT No.: PCT/DE2006/001241

§ 371 (c)(1), (2), (4) Date: May 18, 2007

(87) PCT Pub. No.: WO2007/009442

PCT Pub. Date: Jan. 25, 2007

(65) Prior Publication Data

US 2008/0042505 A1 Feb. 21, 2008

(30) Foreign Application Priority Data

Jul. 20, 2005 (DE) ......................... 10 2005 034 486

(51) Int. Cl.
*H02K 1/06* (2006.01)
*H01F 1/147* (2006.01)
*H01F 41/02* (2006.01)
*H02K 1/02* (2006.01)

(52) U.S. Cl.
CPC .......... *H01F 1/14716* (2013.01); *H01F 41/024* (2013.01)
USPC . 29/596; 29/598; 310/216.004; 310/216.011; 310/216.006

(58) Field of Classification Search
USPC ............ 310/216, 216.004, 216.006, 216.011; 29/596, 598
IPC ................................................ H02K 1/02,1/06
See application file for complete search history.

(56) References Cited

U.S. PATENT DOCUMENTS

| | | | | |
|---|---|---|---|---|
| 2,225,730 | A | 12/1940 | Armstrong | |
| 2,926,008 | A | 2/1960 | Barnett et al. | |
| 2,960,744 | A | 11/1960 | Blank | |
| 3,255,512 | A | 6/1966 | Lochner et al. | |
| 3,337,373 | A * | 8/1967 | Foster et al. | 148/308 |
| 3,401,035 | A | 9/1968 | Moskowitz et al. | |
| 3,502,462 | A | 3/1970 | Dabkowski et al. | |
| 3,624,568 | A | 11/1971 | Olsen et al. | |
| 3,634,072 | A * | 1/1972 | Ackermann et al. | 420/581 |
| 3,718,776 | A * | 2/1973 | Bate et al. | 360/125.33 |
| 3,977,919 | A | 8/1976 | Foster et al. | |
| 4,076,525 | A | 2/1978 | Little et al. | |
| 4,076,861 | A | 2/1978 | Furukawa et al. | |
| 4,120,704 | A | 10/1978 | Anderson | |
| 4,160,066 | A | 7/1979 | Szumachowski et al. | |
| 4,171,978 | A | 10/1979 | Inoue | |
| 4,201,837 | A * | 5/1980 | Lupinski | 428/457 |
| 4,601,765 | A | 7/1986 | Soileau et al. | |
| 4,648,929 | A | 3/1987 | Siman | |
| 4,891,079 | A | 1/1990 | Nakajima et al. | |
| 4,923,533 | A | 5/1990 | Shigeta et al. | |
| 4,950,550 | A | 8/1990 | Radeloff et al. | |
| 4,969,963 | A | 11/1990 | Honkura et al. | |
| 4,994,122 | A | 2/1991 | DeBold et al. | |
| 5,069,731 | A | 12/1991 | Yoshizawa et al. | |
| 5,091,024 | A | 2/1992 | DeBold et al. | |
| 5,200,002 | A | 4/1993 | Hilzinger | |
| 5,202,088 | A | 4/1993 | Genma et al. | |
| 5,252,148 | A | 10/1993 | Shigeta et al. | |
| 5,261,152 | A | 11/1993 | Simozaki et al. | |
| 5,268,044 | A | 12/1993 | Hemphill et al. | |
| 5,449,419 | A | 9/1995 | Suzuki et al. | |
| 5,501,747 | A * | 3/1996 | Masteller et al. | 148/311 |
| 5,522,946 | A | 6/1996 | Tomita et al. | |
| 5,522,948 | A | 6/1996 | Sawa et al. | |
| 5,534,081 | A | 7/1996 | Takagi et al. | |

(Continued)

FOREIGN PATENT DOCUMENTS

| | | | |
|---|---|---|---|
| CH | 668331 | A5 * | 12/1988 |
| CN | 1185012 | A | 6/1998 |
| DE | 502063 | | 7/1930 |
| DE | 694374 | | 7/1940 |
| DE | 1740491 | | 12/1956 |

(Continued)

OTHER PUBLICATIONS

Machine translation of CH 668331 A5.*
Major and Orrock, "High Saturation Ternary Cobalt-Iron Based Alloys," IEEE Transactions on Magnetics, vol. 24, No. 2, Mar. 1988, pp. 1856-1858.

(Continued)

*Primary Examiner* — Michael Andrews
(74) *Attorney, Agent, or Firm* — Dickinson Wright PLLC

(57) ABSTRACT

The invention relates to a method for the production of a soft magnetic core for generators and generator with a core of this type. To produce a core, a plurality of magnetically activated and/or magnetically activatable textured laminations is produced from a CoFeV alloy. This plurality of laminations is then stacked to form a core assembly. Then the core assembly, if consisting of magnetically activatable laminations, is magnetically activated. Finally, the magnetically activated core assembly is eroded to produce a soft magnetic core. A core of this type is suitable for a generator with a stator and a rotor for high-speed aviation turbines, the laminations in the core assembly being oriented in different texture directions relative to one another.

25 Claims, No Drawings

(56) References Cited

U.S. PATENT DOCUMENTS

| | | | |
|---|---|---|---|
| 5,594,397 | A | 1/1997 | Uchikoba et al. |
| 5,611,871 | A | 3/1997 | Yoshizawa et al. |
| 5,703,559 | A | 12/1997 | Emmerich et al. |
| 5,714,017 | A | 2/1998 | Tornida et al. |
| 5,725,686 | A | 3/1998 | Yoshizawa et al. |
| 5,741,373 | A | 4/1998 | Suzuki et al. |
| 5,741,374 | A | 4/1998 | Li |
| 5,769,974 | A | 6/1998 | Masteller et al. |
| 5,804,282 | A | 9/1998 | Watanabe et al. |
| 5,817,191 | A | 10/1998 | Emmerich et al. |
| 5,911,840 | A | 6/1999 | Couderchon et al. |
| 5,914,088 | A | 6/1999 | Rao et al. |
| 5,922,143 | A | 7/1999 | Verin et al. |
| 5,976,274 | A | 11/1999 | Inoue et al. |
| 6,028,353 | A | 2/2000 | Nakano et al. |
| 6,106,376 | A | 8/2000 | Rybak et al. |
| 6,118,365 | A | 9/2000 | Petzold et al. |
| 6,146,474 | A | 11/2000 | Coutu et al. |
| 6,171,408 | B1 | 1/2001 | Herzer et al. |
| 6,181,509 | B1 | 1/2001 | Canlas et al. |
| 6,270,592 | B1 | 8/2001 | Nakajima et al. |
| 6,331,363 | B1 | 12/2001 | DeCristofaro et al. |
| 6,373,368 | B1 | 4/2002 | Shikama et al. |
| 6,416,879 | B1 | 7/2002 | Sakamoto et al. |
| 6,425,960 | B1 | 7/2002 | Yoshizawa et al. |
| 6,462,456 | B1 | 10/2002 | DeCristofaro et al. |
| 6,487,770 | B1 | 12/2002 | Bernauer et al. |
| 6,507,262 | B1 | 1/2003 | Otte et al. |
| 6,563,411 | B1 | 5/2003 | Otte et al. |
| 6,580,348 | B1 | 6/2003 | Hundt et al. |
| 6,588,093 | B1 | 7/2003 | Emmerich et al. |
| 6,616,125 | B2 | 9/2003 | Brown et al. |
| 6,668,444 | B2 | 12/2003 | Ngo et al. |
| 6,685,882 | B2 * | 2/2004 | Deevi et al. .................. 420/124 |
| 6,710,692 | B2 | 3/2004 | Kato et al. |
| 6,749,767 | B2 | 6/2004 | Mitani et al. |
| 6,791,445 | B2 | 9/2004 | Shibata et al. |
| 6,942,741 | B2 | 9/2005 | Shimao et al. |
| 6,946,097 | B2 | 9/2005 | Deevi et al. |
| 6,962,144 | B2 | 11/2005 | Chretien et al. |
| 7,128,790 | B2 | 10/2006 | Waeckerle et al. |
| 7,442,263 | B2 | 10/2008 | Günther et al. |
| 7,532,099 | B2 | 5/2009 | Brunner |
| 7,563,331 | B2 | 7/2009 | Petzold et al. |
| 2002/0062885 | A1 | 5/2002 | Li |
| 2002/0158540 | A1 * | 10/2002 | Lindquist et al. ............. 310/216 |
| 2003/0020579 | A1 | 1/2003 | Ngo et al. |
| 2003/0034091 | A1 | 2/2003 | Shimao et al. |
| 2003/0193259 | A1 * | 10/2003 | Shah et al. .................... 310/217 |
| 2004/0025841 | A1 | 2/2004 | Chretien et al. |
| 2004/0027220 | A1 | 2/2004 | Günther et al. |
| 2004/0089377 | A1 | 5/2004 | Deevi et al. |
| 2004/0099347 | A1 | 5/2004 | Waeckerle et al. |
| 2004/0112468 | A1 | 6/2004 | Petzold et al. |
| 2004/0183643 | A1 | 9/2004 | Brunner |
| 2005/0017587 | A1 * | 1/2005 | Koenig .................... 310/156.19 |
| 2005/0268994 | A1 | 12/2005 | Gerster et al. |
| 2007/0176025 | A1 | 8/2007 | Gerster |
| 2008/0099106 | A1 | 5/2008 | Pieper et al. |
| 2008/0136570 | A1 | 6/2008 | Gerster |
| 2009/0039994 | A1 | 2/2009 | Pieper et al. |
| 2009/0145522 | A9 | 6/2009 | Pieper et al. |
| 2009/0184790 | A1 | 7/2009 | Pieper et al. |
| 2010/0265016 | A1 | 10/2010 | Petzold et al. |

FOREIGN PATENT DOCUMENTS

| | | | | |
|---|---|---|---|---|
| DE | 1564643 | | 1/1970 | |
| DE | 2045015 | A1 | 3/1972 | |
| DE | 2242958 | A1 | 3/1974 | |
| DE | 2816173 | | 10/1979 | |
| DE | 3324729 | | 1/1984 | |
| DE | 3237183 | | 4/1984 | |
| DE | 3542257 | | 6/1987 | |
| DE | 4030791 | A1 | 8/1991 | |
| DE | 19537362 | A1 | 4/1996 | |
| DE | 4444482 | A1 | 6/1996 | |
| DE | 19608891 | A1 | 9/1997 | |
| DE | 69714103 | T2 | 9/1997 | |
| DE | 19635257 | | 3/1998 | |
| DE | 19802349 | A1 | 7/1998 | |
| DE | 69810551 | T2 | 3/1999 | |
| DE | 19844132 | | 4/1999 | |
| DE | 19818198 | A1 | 10/1999 | |
| DE | 19860691 | A1 | 3/2000 | |
| DE | 19928764 | A1 | 1/2001 | |
| DE | 69611610 | T2 | 7/2001 | |
| DE | 10024824 | | 11/2001 | |
| DE | 10031923 | A1 | 1/2002 | |
| DE | 69903202 | T2 | 6/2003 | |
| DE | 69528272 | T2 | 7/2003 | |
| DE | 10211511 | A1 | 10/2003 | |
| DE | 10320350 | B3 | 9/2004 | |
| DE | 102006055088 | B4 | 6/2008 | |
| EP | 0216457 | A1 | 4/1987 | |
| EP | 0240755 | | 10/1987 | |
| EP | 0299498 | | 1/1989 | |
| EP | 0429022 | | 5/1991 | |
| EP | 0271657 | | 5/1992 | |
| EP | 0635853 | | 1/1995 | |
| EP | 0637038 | | 2/1995 | |
| EP | 0435680 | B1 | 4/1995 | |
| EP | 0715320 | A1 | 6/1996 | |
| EP | 0794541 | A1 | 9/1997 | |
| EP | 0804796 | | 11/1997 | |
| EP | 0899 753 | B1 | 3/1999 | |
| EP | 0795881 | B1 | 6/1999 | |
| EP | 0824755 | | 1/2001 | |
| EP | 1124999 | A1 | 8/2001 | |
| EP | 0771466 | B1 | 9/2002 | |
| EP | 1475450 | A1 | 11/2004 | |
| EP | 1503486 | A1 * | 2/2005 | ............ H02K 15/03 |
| GB | 833446 | | 4/1960 | |
| GB | 1369844 | A | 10/1974 | |
| JP | 54006808 | A | 1/1979 | |
| JP | 59058813 | A | 4/1984 | |
| JP | 59177902 | | 10/1984 | |
| JP | 61058450 | A | 3/1986 | |
| JP | 61253348 | | 11/1986 | |
| JP | 62093342 | A | 4/1987 | |
| JP | 63-115313 | A | 5/1988 | |
| JP | 64-053404 | | 3/1989 | |
| JP | 1247557 | A | 3/1989 | |
| JP | 2-111003 | A | 4/1990 | |
| JP | 02301544 | | 12/1990 | |
| JP | 03-019307 | | 1/1991 | |
| JP | 03-146615 | | 6/1991 | |
| JP | 4-21436 | | 1/1992 | |
| JP | 4-365305 | A | 12/1992 | |
| JP | 05283238 | | 10/1993 | |
| JP | 05-299232 | | 11/1993 | |
| JP | 06-033199 | | 2/1994 | |
| JP | 6-176921 | A | 6/1994 | |
| JP | 06-224023 | | 8/1994 | |
| JP | 08-246109 | | 9/1996 | |
| JP | 63021807 | | 1/1998 | |
| JP | 10-092623 | | 4/1998 | |
| JP | 10-097913 | | 4/1998 | |
| JP | 11-67532 | A | 3/1999 | |
| JP | 2000-182845 | | 6/2000 | |
| JP | 2000-277357 | A | 10/2000 | |
| JP | 2001-068324 | | 3/2001 | |
| JP | 2002294408 | A | 3/2001 | |
| JP | 2004-063798 | A | 7/2002 | |
| JP | 2002-343626 | A | 11/2002 | |
| JP | 2006193779 | | 7/2006 | |
| JP | 2006322057 | | 11/2006 | |
| JP | 2007113148 | | 5/2007 | |
| SU | 338550 | | 5/1972 | |
| WO | WO 96/00449 | | 1/1996 | |
| WO | WO 96/19001 | | 6/1996 | |
| WO | WO 00/28556 | | 5/2000 | |
| WO | WO 00/30132 | | 5/2000 | |

(56) References Cited

FOREIGN PATENT DOCUMENTS

| | | | |
|---|---|---|---|
| WO | WO 01/00895 | A1 | 1/2001 |
| WO | WO 01/86665 | A1 | 11/2001 |
| WO | WO 02/055749 | A1 | 7/2002 |
| WO | WO 03/003385 | A2 | 1/2003 |
| WO | WO 2007/088513 | | 8/2007 |

OTHER PUBLICATIONS

Witold Pieper et al., "Soft Magnetic Iron-Cobalt Based Alloy and Method for Its Production", German Application No. DE 10 2006 051 715.6, International Filing Date Oct. 30, 2006, U.S. Appl. No. 11/878,856, filed Jul. 27, 2007.

Böhler N114 EXTRA; Nichtrostender Weichmagnetischer Stahl Stainless Soft Magnetic Steel; Böhler Edelstahl GMBH & Co KG; N244 DE EM-WS; 11 pgs.

Carpenter Specialty Alloys; Alloy Data, Chrome Core 8 & 8-FM Alloys and Chrome Core 12 & 12-FM Alloys; Carpenter Technology Corporation; Electronic Alloys; 12 pgs.

Sundar, R.S. et al.; Soft Magnetic FeCo alloys; alloy development, processing, and properties; International Materials Reviews, vol. 50, No. 3, pp. 157-192.

First Office Action mailed Jan. 7, 2005 issued by the Chinese Patent Office for Chinese Patent Application No. 02809188.4.

Second Office Action mailed Jul. 8, 2005 issued by the Chinese Patent Office for Chinese Patent Application No. 02809188.4.

Liu Junxin et Yuqin Qiu: "Heat Treating Method of Nanocrystalline Current Transformer Core" (English Translation and Certificate of Translation dated Nov. 23, 2009).

H. Reinboth, "Technologie and Anwendung magnetischer Werkstoffe," Veb Verlag Technik, p. 230 (1969) (English Translation and Certificate of Translation dated Nov. 23, 2009).

German Patent Publication No. 694374 (English Translation and Certificate of Translation dated Nov. 23, 2009).

Chinese Patent Publication No. CN1185012A (English Translation and Certificate of Translation dated Nov. 23, 2009).

Non-Final Office Action dated Sep. 29, 2008 for U.S. Appl. No. 11/343,558.

Non-Final Office Action dated Apr. 6, 2009 for U.S. Appl. No. 11/343,558.

Final Office Action dated Oct. 30, 2009 for U.S. Appl. No. 11/343,558.

Examination Report dated Feb. 26, 2003 for German Patent Publication No. 101 34 056.7-33 (English Translation and Certificate of Translation dated Nov. 23, 2009).

E. Wolfarth: "Ferromagnetic Materials vol. 2,"—Soft Magnetic Metallic Materials—p. 73 (1980).

ASM Materials Engineering Dictionary, Edited by J.R. Davis, Davis & Associates, 1992, p. 2002.

Yoshizawa, Y. et al.; Magnetic Properties of High B2 Nanocrystalline FeCoCuNbSiB Alloys, Advanced Electronics Research Lab, Hitachi Metals, Ltd., 5200 Mikajiri Kumagaya, Japan, 0-7803-9009-1/05/ $20.00 © 2005 IEEE; BR 04.

Examination Report dated Sep. 24, 2009 for European Publication No. 02 745 429.7—2208 (English Translation and Certificate of Translation dated Dec. 30, 2010).

Notification of Reasons for Refusal dated Feb. 2, 2010 for Japanese Patent Publication No. 2002-527519 and English Translation of the same.

Heczko, O. et al., "Magnetic Properties of Compacted Alloy Fe 73.5Cu7Nb3Si13.5B9 in Amorphous and Nanocrystalline State", IEEE Transaction Magazine, vol. 29, No. 6, 1993, 2670 English Abstract.

Office Action dated Apr. 22, 2010 for German Patent Application No. 10 2009 038 730.7-24 and English Translation of the same.

International Search Report dated Nov. 26, 2008 for International Application No. PCT/EP2008/005877.

Non-Final Office Action dated Jun. 11, 2009 for U.S. Appl. No. 11/663,271.

Non-Final Office Action dated Sep. 22, 2009 for U.S. Appl. No. 11/663,271.

Non-Final Office Action dated Apr. 1, 2010 for U.S. Appl. No. 11/343,558.

Final Office Action dated Oct. 15, 2010 for U.S. Appl. No. 11/343,558.

Non-Final Office Action dated Aug. 31, 2010 for U.S. Appl. No. 11/878,856.

Restriction Requirement dated Nov. 4, 2009 for U.S. Appl. No. 11/878,856.

Non-Final Office Action dated Mar. 22, 2010 for U.S. Appl. No. 11/878,856.

Restriction Requirement dated Sep. 22, 2010 for U.S. Appl. No. 12/219,615.

Restriction Requirement dated Apr. 26, 2010 for U.S. Appl. No. 12/486,528.

Non-Final Office Action dated Jul. 27, 2010 for U.S. Appl. No. 12/486,528.

* cited by examiner

METHOD FOR PRODUCTION OF A SOFT-MAGNETIC CORE HAVING COFE OR COFEV LAMINATIONS AND GENERATOR OR MOTOR COMPRISING SUCH A CORE

This application is a 371 of PCT/DE2006/001241, filed Jul. 18, 2006.

BACKGROUND OF THE INVENTION

1. Field of the Invention

The invention relates to a method for the production of a soft magnetic core for generators and generator with a core of this type. For this purpose, plurality of laminations of a soft magnetic alloy magnetically activatable by a final annealing process is stacked and the stack is given the shape of a soft magnetic core, e.g., by eroding the core assembly. The final shaping of the core assembly is usually followed by final annealing to optimise the magnetic properties of the core in its final form.

2. Description of Related Art

A method of this type for the production of a core in the form of a stack of a plurality of thin-walled layers of a magnetically conductive material is known from CH 668 331 A5. In this known method, the cold rolled soft magnetic laminations for the individual layers are stacked in identical orientation and eroded to form the final core. The erosion process may be followed by the final annealing of the core consisting of a plurality of thin-walled layers of a magnetically conductive material.

In such a process, however, there is a risk that the dimensions of the core may be changed by this final annealing or formatting, in particular if there is an anisotropic rearrangement of the soft magnetic core at certain phase formations during the final annealing or activation process, which affects large-volume soft magnetic cores in particular, as these are more prone to anisotropic dimensional changes. Such anisotropic changes may in addition cause unbalance in rotating core structures, which leads to significant problems in high-speed machines, in particular in aviation applications.

The cold rolling process moreover results in a crystalline texture, which may cause anisotropies of magnetic and mechanical properties. These anisotropies are undesirable in rotating cores, such as those of a high-speed rotor or of stators interacting with rotating components, because such applications demand a precisely rotationally symmetrical distribution of magnetic and mechanical properties.

The teaching of CH 668 331 A5, wherein cold rolled laminations are evenly stacked in rolling direction in order to utilise the increased magnetic effect in the direction of the "GOSS texture" for stationary magnetic heads, can therefore not be applied to the requirements of rotating cores. There is therefore a need for developing new manufacturing solutions to meet the demand for a rotationally symmetrical uniformity of the magnetic and mechanical properties of a soft magnetic core in generators.

SUMMARY OF INVENTION

The invention is based on the problem of specifying a method for the production of a soft magnetic core for generators and generator with a core of this type, which solve the problems described above. It is in particular aimed at the production of a soft magnetic core suitable for large-volume applications in high-speed generators.

This problem is solved by the subject matter of the independent claims. Advantageous further developments of the invention are described in the dependent claims.

The invention creates a method for the production of a soft magnetic core for generators, which comprises the following steps.

First, a plurality of magnetically activated and/or magnetically activatable laminations of a binary cobalt-iron alloy (CoFe alloy) or a ternary cobalt-iron-vanadium alloy (CoFeV alloy) is produced, the laminations having a cold rolled texture.

Binary iron-cobalt alloys with a cobalt content of 33 to 55% by weight are extremely brittle, which is due to the formation of an ordered superstructure at temperatures below 730° C. The addition of about 2% by weight of vanadium affects the transition to this superstructure, so that a relatively good cold formability can be obtained by quenching to ambient temperature from temperatures above 730° C.

Suitable base alloys are therefore the known iron-cobalt-vanadium alloys with approximately 49% by weight of iron, 49% by weight of cobalt and 2% by weight of vanadium. This ternary alloy system has been known for some time. It is, for example, described in detail in "R. M. Bozorth, Ferromagnetism, van Nostrand, N.Y. (1951). This iron-cobalt alloy with an addition of vanadium is characterised by its very high saturation inductance of approximately 2.4 T.

A further development of this iron-cobalt base alloy with an addition of vanadium is known from U.S. Pat. No. 3,634,072. This describes a quenching of the hot rolled alloy strip from a temperature above the phase transition temperature of 730° C. in the production of alloy strips. This process is necessary to make the alloy sufficiently ductile for subsequent cold rolling. The quenching suppresses the ordering process. In terms of manufacturing technology, however, quenching is highly critical, because the strip can break very easily in the so-called cold rolling passes. In view of this, there have been significant attempts to improve the ductility of the alloy strips and thus the safety of the production process.

To improve ductility, U.S. Pat. No. 3,634,072 therefore proposes an addition of 0.03 to 0.5% by weight of niobium and/or 0.07 to 0.3% by weight of zirconium.

Niobium, which may be replaced by the homologous tantalum, does not only firmly suppress the degree of order in the iron-cobalt alloy system, which has been described, for example, by R. V. Major and C. M. Orrock in "High saturation ternary cobalt-iron based alloys", but is also impedes grain growth.

The addition of zirconium in maximum quantities of 0.3% by weight as proposed in U.S. Pat. No. 3,634,072 also impedes grain growth. Both mechanisms significantly improve the ductility of the alloy after quenching.

In addition to this high-strength iron-cobalt-vanadium alloy with niobium and zirconium as known from U.S. Pat. No. 3,634,072, zirconium-free alloys are known from U.S. Pat. No. 5,501,747.

This publication proposes iron-cobalt-vanadium alloys for application in high-speed aircraft generators and magnetic bearings. U.S. Pat. No. 5,501,747 is based on the teaching of U.S. Pat. No. 3,634,072 and limits the niobium content proposed there to 0.15 to 0.5% by weight.

Particularly suitable is a CoFeV alloy consisting of:

$35.0 \leq Co \leq 55.0\%$ by weight, $0.75 \leq V \leq 2.5\%$ by weight, $0 \leq (Ta + 2 \times Nb) \leq 1.0\%$ by weight, $0.3 < Zr \leq 1.5\%$ by weight, $Ni \leq 5.0\%$ by weight.

The rest is Fe plus impurities caused by smelting or and/or random impurities. These alloys and the associated production methods are described in detail in DE 103 20 350 B3, to which we hereby expressly refer.

In addition, the adjustment of the boron content of such a ternary CoFeV alloy to 0.001 to 0.003% by weight in order to improve hot rolling properties is known from DE 699 03 202 T2.

All of the above alloys are excellently suited for the production of core assemblies according to the present invention.

The plurality of laminations is then stacked to form a core assembly. If this stack consists of activatable laminations, the core assembly is formed by means of final annealing prior to being structured to form a soft magnetic core. If, on the other hand, the core assembly consists of laminations which are already soft magnetically activated, the stacking process can be followed immediately by structuring the magnetically activated core assembly or the stack of magnetically activated laminations to produce a soft magnetic core.

This method offers the advantage that the structuring process is in all cases completed at the end of the overall production process for a soft magnetic core.

DETAILED DESCRIPTION OF SPECIFIC EMBODIMENTS

The invention will be more clearly understood by reference to the specific embodiments, which are not intended to limit the scope of the invention, or of the appended claims.

The core assembly is preferably structured to form a soft magnetic core by means of an erosion method. Erosion removes material by means of a sequence of non-stationary electric discharges, wherein the discharges are separated by time, i.e. only single sparks are generated at any time in this spark erosion process. The spark discharges are generated by voltage sources above 200 V and conducted in a dielectric machining medium into which the core assembly consisting of soft magnetic layers is immersed. This spark erosive machining process is also known as electro-chemical machining or EDM (electrical discharge machining).

In the implementation of the method according to the invention, a wire spark erosion process is preferably conducted, offering the advantage that the core assembly is precisely eroded to the pre-programmed profile of the soft magnetic core in an insulating fluid with the aid of the wire electrode. During the wire spark erosion process, the final shape and surface of the machined core assembly can be monitored 100%, resulting in surfaces with high dimensional accuracy and minimum tolerances.

As far as the geometry of the core assembly and the material characteristics of the stacked laminations permit, the core assembly can also be structured to form a soft magnetic core by chip removal.

Further possible structuring methods are water jet cutting and laser cutting. While water jet cutting involves the risk of the formation of crater-shaped cut edges, laser cutting tends to deposit evaporating material adjacent to the cut edges in the form of micro-beads. Only a combination of the two methods results in a high cutting quality when structuring the core assembly to form a soft magnetic core. For this purpose, the diverging laser beam is held within the micro-water jet by means of total reflection, and the material removed by the laser beam is entrained by the micro-water jet, preventing any deposits on the cut edges. The resulting cut profiles are therefore free from burrs. The heating of the cut edges is likewise negligible, so that there is no thermal distortion. Water jet-guided laser cutting can achieve bore diameters $d_B \leq 60$ μm and cutting widths $b_S \leq 50$ μm. Owing to the water jet guidance, the material characteristics expediently do not change in the cut edge zones.

In a preferred embodiment of the method, the CoFeV alloy is for magnetic activation subjected to final annealing in an inert gas atmosphere at a forming temperature $T_F$ between 500° C.$\leq T_F \leq$940° C. In this soft magnetic activation process, it is found that the cobalt-iron-vanadium alloy grows anisotropically, the dimensional changes being presumably caused by the ordering in the CoFe system, while any anisotropy of the dimensional changes can be ascribed to the texture generated in the cold rolling process.

A change in length of approximately 0.2% has been observed in rolling direction during the subsequent forming process, while the change in length at right angles to the rolling direction is 0.1%. On the basis of a core size of 200 mm, the laminations change by 0.4 mm in one direction and by 0.2 mm in the other direction, so that the cross-section of a cylindrical soft magnetic core changes from a circular shape before forming to an elliptical shape after forming. This change of shape is avoided by the method according to the invention, because the core assembly is eroded following the soft magnetic forming or the final annealing of the CoFeV alloy.

In a further preferred embodiment of the invention, the laminations are oriented in different texture directions relative to one another while being stacked. This orientation in different texture directions differs from the procedure adopted in CH 668 331 A5 and offers the advantage of reducing unbalance, in particular in rotating soft magnetic cores. In addition, the anisotropies of the magnetic and mechanical properties due to texture are compensated, resulting in a rotationally symmetrical distribution of the soft magnetic and mechanical properties. The laminations are preferably oriented in succession at a clockwise or anticlockwise angle of 45° relative to their texture directions. In this way, the differences in length referred to above can be compensated more easily, in particular if the whole of the core assembly is subjected to soft magnetic activation.

If individual laminations or plates of the assembly are formed before stacking, the individual laminations or plates should preferably be as flat as possible to achieve a maximum lamination factor f≥90% for the core assembly. The electrically insulated flat and final-annealed laminations are offset in stacking to compensate for a lens profile in cross-section generated by the cold rolling process. This lens profile is identified by a difference of a few μm between the thickness of the laminations in the edge region and their thickness in the central region. In stacks of 1000 or more laminations, which are required for the soft magnetic core or a rotor or stator in a generator, these differences amount to several millimeters, so that the offsetting by an angle of 45° or 90° results in an additional improvement and better uniformity of the core assembly.

Before stacking, an electrically insulating coating is applied to at least one side of the magnetically activated laminations. As the magnetically activated laminations have been subjected to final annealing prior to stacking, this insulating coating for magnetically activated laminations may be a paint or resin coating, in particular as there is no need to subject the core assembly to a final annealing process. If, on the other hand, magnetically activatable laminations are stacked, a ceramic insulating coating is applied to at least one side prior to stacking, which can withstand the activating temperatures referred to above. It is also possible to oxidise the magnetically activated laminations prior to stacking in a water vapour atmosphere or an oxygen-containing atmosphere to form an electrically insulating metal oxide layer. This offers the advantage of an extremely thin and effective insulation between the metal plates.

For final annealing prior to eroding, the core assembly of magnetically activatable laminations is clamped between two steel plates used as annealing plates. In the subsequent erosion process, these annealing plates can also be used to locate the core assembly. The steel plates retain the laminations in position, resulting in a dimensionally more accurate core assembly in terms of both internal and external diameter and in terms of the slots required for the soft magnetic core of a stator or rotor. In such dimensionally accurate slots, the winding for a rotor or stator can be optimally accommodated, resulting in advantageously high current densities in the slot cross-section.

In a preferred embodiment of the invention, a generator with a stator and a rotor is created for high-speed aviation turbines, the stator and/or rotor comprising a soft magnetic core. The soft magnetic core is formed from a dimensionally stable eroded core assembly of a stack of a plurality of soft magnetically activated laminations of a CoFeV alloy. The laminations of the core assembly have a cold rolled texture and are oriented in different texture directions within the core assembly. A soft magnetic core of this type offers the advantage of an above average saturation inductance of approximately 2.4 T combined with mechanical properties including a yield strength above 600 MPa to withstand the extreme loads to which generators for high-speed aviation turbines with 10 000 to 40 000 rpm are subjected.

The texture directions of the individual laminations are preferably oriented at an angle of 45° relative to one another to compensate for the differences in the dimensional changes of the various texture directions. As far as the thickness of the soft magnetic laminations in the core assembly is concerned, laminations with a thickness $d<350$ μm or $d<150$ μm are preferably used, in particular extremely thin laminations with a thickness in the order of 75 μm. These thin soft magnetic laminations are provided with an electrically insulating coating on at least one side, which may be represented by an oxide layer.

Ceramic coatings are used for laminations in core assemblies if the soft magnetic activation process involves a final annealing of the core assembly after stacking and before erosive forming.

Depending on the dimensions required for such soft magnetic cores of a rotor or stator, a number n of soft magnetically formed laminations is stacked, n being ≥100. In addition to its main ingredients, the CoFeV alloy may contain at least one element from the group including Ni, Zr, Ta or Nb. The zirconium content in a preferred embodiment of the invention exceeds 0.3% by weight, resulting in significantly better mechanical properties combined with excellent magnetic properties.

This improvement is due to the fact that the addition of zirconium in amounts above 0.3% by weight occasionally results within the structure of the CoFeV alloy in the formation of a hitherto unknown cubic Laves phase between the individual grains of the CoFeV alloy, which has a positive effect on its mechanical and magnetic properties.

In order to increase yield strength above 600 MPa, tantalum or niobium is added to the alloy, preferably in the order of $0.4 \leq (Ta+2 \times Nb) \leq 0.8\%$ by weight.

Particularly suitable has been found a CoFeV alloy consisting of:

$35.0 \leq Co \leq 55.0\%$ by weight, $0.75 \leq V \leq 2.5\%$ by weight, $0 \leq (Ta+2 \times Nb) \leq 1.0\%$ by weight, $0.3 < Zr \leq 1.5\%$ by weight, $Ni \leq 5.0\%$ by weight, Rest Fe plus impurities caused by smelting or and/or random impurities.

The invention is explained in greater detail below with reference to a specific embodiment.

For actuators, generators and/or electric motors for aviation applications, a CoFeV alloy is expediently used to reduce the weight of these systems. In stator or rotor core assemblies of so-called reluctance motors for aviation applications, extremely fine dimensional tolerances are required in addition to high magnetic saturation and good soft magnetic material characteristics.

At high speeds up to 40 000 rpm, the rotor in particular has to have a high strength. To reduce losses at high alternating field frequencies, these assemblies for the soft magnetic core of the rotor or stator are built up from extremely thin soft magnetic laminations with a thickness of 500, 350, 150 or even 75 μm. In this embodiment of the invention, the stator has an external diameter of approximately 250 mm and an internal diameter of approximately 150 mm at a lamination thickness of 300 μm and a height of approximately 200 mm.

Approximately 650 laminations are used in the core assembly of the stator. As mentioned above, cold-rolled CoFeV alloys grow 0.2% in length in strip direction and 0.1% in width at right angles to the strip direction when subjected to magnetic final annealing or forming. In order to ensure the dimensional accuracy of components with a fine tolerance band nevertheless, this embodiment of the invention provides for the production of the components from formed strip. To insulate the individual laminations from one another, the activation process is followed by oxidising annealing in this embodiment of the invention. In view of the minimum thickness of the laminations and the fine dimensional tolerances, the production of individual laminations followed by stacking the completed laminations would involve high costs and result in high failure rates. For this reason, the method according to the invention involves the erosion of the assembly of the soft magnetically activated, annealed and oxidised laminations.

To summarise, the method includes the following three main steps, i.e. the magnetic activating or final annealing of electrically insulated laminations or strip sections, the optional oxidising annealing of these individual laminations or strip sections and finally the formation of a stacked assembly and the erosion of a rotor core or a stator core from this assembly. In detail, this involves the following steps.

First, a material fulfilling the tolerance requirements of the strip in terms of elliptical shape and curvature is used as a raw material. Thickness tolerances according to EN10140C have to be met. At a lamination thickness of 350 μm, this amounts to a tolerance band of +/−15 μm, at a thickness of 150 μm to a tolerance band of +/−8 μm and at a thickness of 75 μm to a tolerance band of +/−5 μm. When cutting the laminations, burr will have to be kept to a minimum at the edges.

For this reason, a specially developed cutting device is used for significantly reduced burring as the laminations are cut to length from the strip. To hold the laminations during the subsequent oxidation process, 1 or 2 holes are punched in areas not required for the core of the rotor or stator to suspend the laminations in the oxidation unit.

The activation by means of final annealing is conducted between flat steel or ceramic annealing plates. A homogenous annealing temperature distribution has to be ensured for the height of the stack being processed. The activation process has a duration of around 3 hours at a stack thickness of 4 cm and of around 6 hours at a stack thickness of 7 cm. Annealing plates with a thickness of 15 mm are used to load the laminations; these have to be in flat contact, their flatness being checked regularly. When stacking the laminations, the individual layers have to be turned relative to one another, so that the direction of individual laminations changes repeatedly within the stack.

For a verification of activation by means of final annealing, specimen rings and tensile test specimens are added to each stack, the number of specimens being determined by the number of oxidation annealing processes required. The magnetic properties are checked using the specimen rings, the mechanical property limits using the tensile test specimens. This is followed by oxidation, wherein the laminations are suspended individually and without contacting one another in an oxidising oven and oxidised using water vapour or air. The oxidation parameters are determined by the remagnetising frequencies and the later requirements for the location of the core assemblies by adhesive force, depending on whether the core assemblies are stacked by bonding or welding. The insulation between the layers is checked by resistance measurement, as non-insulated areas within the assembly can result in local maximum losses, leading to local heating in the rotor or stator, which has to be avoided. When stacking the laminations for erosion, an offset angle of 45° is advantageous.

Owing to the elliptical shape of the strip used, with a greater thickness in the centre, there may be air gaps between the laminations at the edges of the stack. These air gaps are minimised by the 45° offset. For erosion, the core assembly is first clamped to prevent the bending of the laminations in the erosion process and to minimise the entry of insulating fluid between the laminations.

Following the erosion process, the soft magnetic core is dried and then stored at a dry site. By means of the specimen rings taken from each stack in the forming process, the properties of the raw material and the quality of the final annealing can be determined, particularly as the magnetic properties cannot usually be measured on the completed assembly. After its completion, the core is checked once more; in one embodiment of the invention, a stator was produced, from the final dimensions of which it could be determined that the external diameter with a nominal value of 250 mm and a tolerance band of +0/−0.4 mm showed an actual variation of −3 to −33 μm.

For the internal diameter, at the teeth, a nominal value of 180.00+0.1/−0 mm was given and a variation of +10 to +15 μm was detected. The diameter in the slots where the winding is to be installed has a nominal value of 220.000+0.1/−0 mm, the actual values varying by +9 to +28 μm. The nominal values for the internal diameter and the internal diameter in the slots are particularly important in a stator of this type, because the regrinding of the surface is subject to restrictions. Minor variations in the external diameter, on the other hand, can be corrected by regrinding.

Welded core assemblies can be subjected to “repair annealing” to correct the negative effects of processing, in particular the potential magnetic damage to the core assembly caused by the erosion process. This “repair annealing” may be governed by the same parameters as the magnetic final annealing process. Core assemblies with a ceramic insulating coating are preferably annealed in a hydrogen atmosphere, while core assemblies with an oxide coating are preferably annealed in a vacuum.

The invention having been described with respect to a particular embodiment, those of skill in the art will understand that the scope of the appended claims is not limited to this illustrative embodiment.

The invention claimed is:

1. A method for the production of a soft magnetic core for generators or motors, comprising:

providing a plurality of magnetically activated and/or magnetically activatable laminations from a CoFeV alloy, which alloy comprises a vanadium content V, such that $0.75 \leq V \leq 2.5\%$ by weight;

stacking of the plurality of laminations to form a core assembly;

optionally magnetically activating the core assembly, if it comprises magnetically activatable laminations; and then structuring of the magnetically activated core assembly or the core assembly made of magnetically activated laminations to form a soft magnetic core having rotationally symmetrical uniformity of magnetic properties.

2. The method according to claim 1, wherein the structuring of the core assembly to form a soft magnetic core comprises an erosion process.

3. The method according to claim 2, wherein the erosion process comprises a wire erosion process.

4. The method according to claim 1, wherein the structuring of the core assembly to form a soft magnetic core comprises chip removal.

5. The method according to claim 1, wherein the structuring of the core assembly to form a soft magnetic core comprises water jet cutting.

6. The method according to claim 1, wherein the structuring of the core assembly to form a soft magnetic core comprises laser cutting.

7. The method according to claim 1, wherein the structuring of the core assembly to form a soft magnetic core comprises water jet-guided laser cutting.

8. The method according to claim 1, wherein the magnetic activating comprises a final annealing of the CoFe alloy in an inert gas atmosphere or vacuum at an activating temperature $T_F$ between 500° C.$\leq T_F \leq$940° C.

9. The method according to claim 1, wherein the stacking comprises orienting the laminations in different directions.

10. The method according to claim 9, wherein the directions of two or more of the individual laminations are oriented at an angle of 45° relative to one another.

11. The method according to claim 1, further comprising cold rolling the laminations to a thickness d of 75 μm≤d≤500 μm, prior to stacking.

12. The method according to claim 11, wherein d≤150 μm.

13. The method according to claim 1, further comprising applying an electrically insulating coating to at least one side of the magnetically activated laminations prior to stacking.

14. The method according to claim 1, further comprising applying a ceramic electrically insulating coating to at least one side of the magnetically activatable laminations prior to stacking.

15. The method according to claim 1, further comprising oxidizing the magnetically activated and/or magnetically activatable laminations in an oxidising atmosphere prior to stacking to form an electrically insulating metal oxide layer thereon.

16. The method according to claim 15, wherein said oxidizing comprises suspending the laminations individually and without contacting one another in an oxidizing oven and oxidizing them using water vapor or air.

17. The method according to claim 1, further comprising locating the core assembly made of magnetically activatable laminations between two annealing plates prior to magnetic activation.

18. The method according to claim 1, wherein the stacking comprises stacking a number n of soft magnetically activated and/or activatable laminations for the production of rotor or stator cores, wherein n≥100.

19. A soft magnetic core produced by the method of claim 1.

20. A generator, comprising a stator and a rotor, wherein the stator and/or rotor comprises the soft magnetic core of claim 19.

21. A motor, comprising a stator and a rotor, wherein the stator and/or rotor comprises the soft magnetic core of claim 19.

22. The method according to claim 1, wherein the plurality of magnetically activated and/or magnetically activatable laminations comprises one or more of the elements Zr, Ta, or Nb, as a further alloying element.

23. The method according to claim 1, wherein the plurality of magnetically activated and/or magnetically activatable laminations are from a CoFeV alloy comprising:

$35.0 \leq Co \leq 55.0\%$ by weight, $0.75 \leq V \leq 2.5\%$ by weight, $0 \leq (Ta+2 \times Nb) \leq 1.0\%$ by weight, $0.3 < Zr \leq 1.5\%$ by weight, $Ni \leq 5.0\%$ by weight, with the remainder of the composition being Fe, impurities marked by smelting, random impurities, or combinations of these.

24. The method according to claim 1, wherein said laminations have a cold rolled texture.

25. The method according to claim 1, wherein the stacking of the plurality of laminations to form a core assembly comprises stacking the laminations such that they are turned relative to other laminations in the stack, so that the direction of individual laminations changes repeatedly within the stack.

* * * * *